US012762507B2

(12) United States Patent
Fischer et al.

(10) Patent No.: US 12,762,507 B2
(45) Date of Patent: Oct. 13, 2026

(54) ACTIVITY BASED ENZYME INVENTORY MANAGEMENT

(71) Applicant: BASF SE, Ludwigshafen am Rhein (DE)

(72) Inventors: Stefan Fischer, Lampertheim (DE); Jesper Nielsen, San Diego, CA (US); Simeon Sauer, Heidelberg (DE); Grit Baier, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 591 days.

(21) Appl. No.: 17/632,609

(22) PCT Filed: Sep. 10, 2020

(86) PCT No.: PCT/EP2020/075327
§ 371 (c)(1),
(2) Date: Feb. 3, 2022

(87) PCT Pub. No.: WO2021/048277
PCT Pub. Date: Mar. 18, 2021

(65) Prior Publication Data

US 2022/0284391 A1 Sep. 8, 2022

(30) Foreign Application Priority Data

Sep. 11, 2019 (EP) .................................... 19196805

(51) Int. Cl.
*D06F 33/00* (2020.01)
*D06F 35/00* (2006.01)
(Continued)

(52) U.S. Cl.
CPC ........... *G06Q 10/0838* (2013.01); *G01K 3/04* (2013.01); *G06Q 10/08* (2013.01); *G06Q 10/0832* (2013.01)

(58) Field of Classification Search
CPC ............... G06Q 10/0838; G06Q 10/08; G06Q 10/0832; G01K 3/04
See application file for complete search history.

(56) References Cited

U.S. PATENT DOCUMENTS 5,624,537 A * 4/1997 Turner .................. C12Q 1/002 204/402
7,581,434 B1 * 9/2009 Discenzo ........... G01N 33/2888 73/53.01
(Continued)

FOREIGN PATENT DOCUMENTS

CN 102575286 A 7/2012
CN 103020789 A 4/2013
(Continued)

OTHER PUBLICATIONS

International Application No. PCT/EP2020/075327, International Search Report and Written Opinion, mailed Sep. 24, 2020.
(Continued)

*Primary Examiner* — Talia F Crawley
(74) *Attorney, Agent, or Firm* — ArentFox Schiff LLP

(57) ABSTRACT

The present invention relates to a computer-implemented method for activity based enzyme formulation management of an enzyme formulation comprising (i) receiving input data, preferably via an input unit (10), of at least one storage segment data defined by at least temperature and storage duration and an initial enzyme activity value of said enzyme Predicted degradation formulation; (ii) determining, specifically calculating, a remaining activity value of the enzyme formulation based on the storage segment data and the initial enzyme activity value via a processing unit (20); (iii) providing a remaining activity value for the enzyme formulation, preferably via an output unit (30), and (iv) managing said enzyme formulation based on the remaining activity
(Continued)

Figure 1:
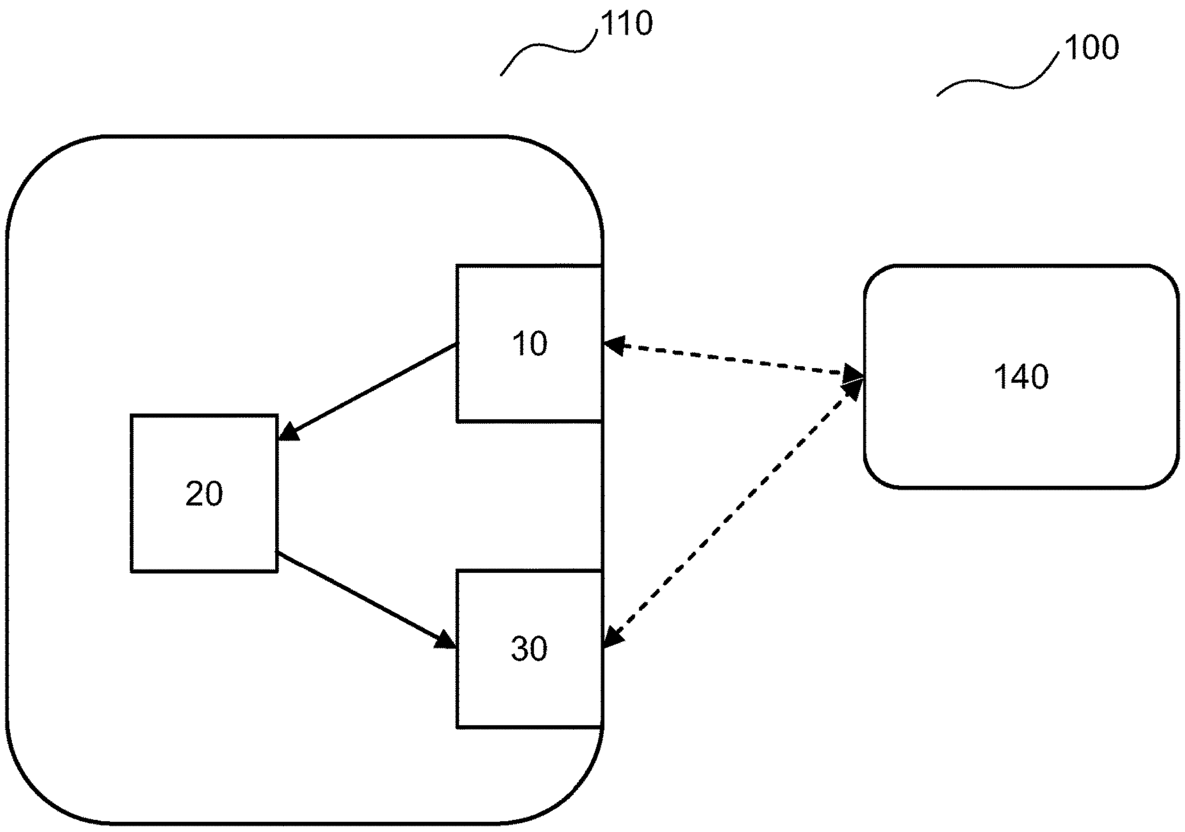

value of step (iii), said managing preferably comprising at least one of —providing a dosage recommendation based on the remaining activity value of the enzyme formulation, preferably via an output unit (30); —providing a residual shelf life indicator for said enzyme formulation based on the remaining activity value of the enzyme formulation; —automated adjustment of a dosage of the enzyme formulation by controlling of a dosing equipment; and/or —eliciting an order of a batch of enzyme formulation if the remaining activity value is indicative of the total enzyme activity in the enzyme formulation being below a pre-determined threshold value. The present invention also relates to an apparatus for activity based enzyme formulation management of an enzyme formulation, comprising: —an input unit (10) configured to receive a data input, preferably a user interface, wherein the data input comprises storage segment data defined by at least temperature and duration and an initial enzyme activity value of said enzyme formulation; —a processing unit (20), preferably a processing unit comprising at least one processor, configured, specifically by programming, to determine, specifically to calculate, a remaining activity value of the enzyme formulation based on the storage segment data and the initial enzyme activity value; and —an output unit (30) configured to output the remaining activity value for the enzyme formulation to the user and/or to a data interface; and to a system comprising said apparatus. The present invention further relates to methods, computer programs, data carriers, and uses related to the aforesaid method, apparatus, and system.

17 Claims, 4 Drawing Sheets

(51) Int. Cl.

| | |
|---|---|
| ***G01K 3/04*** | (2006.01) |
| ***G06Q 10/08*** | (2023.01) |
| ***G06Q 10/083*** | (2023.01) |
| ***G06Q 10/0832*** | (2023.01) |

(56) References Cited

U.S. PATENT DOCUMENTS 8,281,439 B2 * 10/2012 Yusuf ...................... D06F 33/36 8/159
8,696,151 B1 * 4/2014 Barakat .................... G01K 7/42 62/239
2002/0019327 A1 * 2/2002 Yamashita ............... C11D 1/72 510/421
2009/0222235 A1 * 9/2009 Vaillant .................... G01K 3/04 374/102
2014/0283561 A1 * 9/2014 McKenna ........... A47L 15/0055 134/93
2014/0352334 A1 * 12/2014 Barakat .................... G01K 7/42 62/62
2018/0068263 A1 * 3/2018 Ginster, II ........... G06Q 10/087
2021/0032793 A1 * 2/2021 Kessler ................. D06F 39/024

FOREIGN PATENT DOCUMENTS

CN 109146357 A 1/2019
CN 110110824 A 8/2019
EP 1319928 A1 6/2003
EP 1921147 A2 5/2008
WO 2010123908 A1 10/2010

OTHER PUBLICATIONS

Brown et al., Germination of Aristida armata under constant and alternating temperatures and its analysis with the cumulative Weibull distribution as a model, Aust. J. Bot., 35:581-91 (1987).
DelMar et al., A sensitive new substrate for chymotrypsin, Anal. Biochem., 99:316-20 (1979).
Gupta et al., An overview on fermentation, downstream processing and properties of microbial alkaline proteases, Appl. Microbiol. Biotechnol., 60:381-95 (2002).
Gupta et al., Lipase assays for conventional and molecular screening: an overview, Biotechnol. Appl. Biochem., 37:63-71 (2003).
Hoffman, A rapid photoelectric method for the determination of glucose in blood and urine, J. Biol. Chem., 120(1):51-5 (Aug. 1937).
Van Boekel, On the use of the Weibull model to describe thermal inactivation of microbial vegetative cells, Int. J. Food Microbiol., 74:139-59 (2002).
Sant-Anna et al., Kinetic modeling of thermal inactivation of the *Bacillus* sp. protease P7, Bioprocess Biostyst. Eng., 36:993-8 (2013).
Schokker, Kinetic Modelling of Enzyme Inactivation: Kinetics of Heat Inactivation of the Extracellular Proteinase from Pseudomonas fluorescens 22f, Ph.D. Thesis, University of Wageningen, 1997.
Yi et al., "Prediction model for the shelf-life of Trichiurus haumela stored at different temperatures", Transactions of the CSAE, 2009, 25(6): 301-305.

* cited by examiner

ACTIVITY BASED ENZYME INVENTORY MANAGEMENT

CROSS-REFERENCE TO RELATED APPLICATIONS

This is the U.S. national phase of International Application No. PCT/EP2020/075327, filed Sep. 10, 2020, which claims the benefit of European Patent Application No. 19196805.6, filed on Sep. 11, 2019.

The present invention relates to a computer-implemented method for activity based enzyme formulation management of an enzyme formulation comprising (i) receiving input data, preferably via an input unit, of at least one storage segment data defined by at least temperature and storage duration and an initial enzyme activity value of said enzyme formulation; (ii) determining, specifically calculating, a remaining activity value of the enzyme formulation based on the storage segment data and the initial enzyme activity value via a processing unit; (iii) providing a remaining activity value for the enzyme formulation, preferably via an output unit, and (iv) managing said enzyme formulation based on the remaining activity value of step (iii), said managing preferably comprising at least one of —providing a dosage recommendation based on the remaining activity value of the enzyme formulation, preferably via an output unit; —providing a residual shelf life indicator for said enzyme formulation based on the remaining activity value of the enzyme formulation; —automated adjustment of a dosage of the enzyme formulation by controlling of a dosing equipment; and/or —eliciting an order of a batch of enzyme formulation if the remaining activity value is indicative of the total enzyme activity in the enzyme formulation being below a pre-determined threshold value. The present invention also relates to an apparatus for activity based enzyme formulation management of an enzyme formulation, comprising: —an input unit configured to receive a data input, preferably a user interface, wherein the data input comprises storage segment data defined by at least temperature and duration and an initial enzyme activity value of said enzyme formulation; —a processing unit, preferably a processing unit comprising at least one processor, configured, specifically by programming, to determine, specifically to calculate, a remaining activity value of the enzyme formulation based on the storage segment data and the initial enzyme activity value; and —an output unit configured to output the remaining activity value for the enzyme formulation to the user and/or to a data interface; and to a system comprising said apparatus. The present invention further relates to methods, computer programs, data carriers, and uses related to the aforesaid method, apparatus, and system.

Inactivation of enzymes, in particular thermal inactivation may be caused by diverse mechanisms such as denaturation, aggregation, or dissociation into subunits. For this reason, several enzyme stability models were established in the art, e.g. as referenced in Sant'Anna et al. (2013); Bioprocess Biosyst Eng 36:993, Martinus & Boekel (2002), Int J Food Microbiol 74(1-2):139; Brown 1987), Australian J Botany 35(5):581, and as discussed in E. P. Schokker, Ph.D. Thesis, University of Wageningen, 1997.

Nonetheless, enzymes degrade upon storage, especially at higher temperatures than the recommended storage temperature. Moreover, in particular at industrial scale, enzyme products may be exposed to unfavorable storage conditions upon shipping and/or storage (e.g. unplanned lengthy customs process, technical failures in cooling. unplanned interruption of the logistic chain). In all those cases, the only way to find out whether a product is still sellable or usable is a re-test of activity. A problem associated therewith, however, is that usually warehouses are not equipped and employees are not qualified for sample testing. Since a product may still be usable even when the originally specified minimum activity is not reached, if a defined overdosing compared to original recipe can be applied, it is desirable that the remaining activity of an enzyme formulation, depending on storage conditions, is known or predictable.

There is, thus, a need in the art to provide reliable means and methods for activity based enzyme formulation management. In particular, there is a need to provide means and methods avoiding at least in part the drawbacks of the prior art as discussed above.

This problem is solved by the methods, apparatus, system, and uses with the features of the independent claims. Preferred embodiments, which might be realized in an isolated fashion or in any arbitrary combination are listed in the dependent claims.

Accordingly, the present invention relates to a computer-implemented method for activity based enzyme formulation management of an enzyme formulation comprising (i) receiving input via an input unit of at least one storage segment data defined by at least temperature and storage duration and an initial enzyme activity value of said enzyme formulation;
(ii) determining, specifically calculating, a remaining activity value of the enzyme formulation based on the storage segment data and the initial enzyme activity value via a processing unit;
(iii) providing a remaining activity value for the enzyme formulation, preferably via an output unit; and
(iv) managing said enzyme formulation based on the remaining activity value of step (iii).

The method of the present invention may comprise steps in addition to those explicitly mentioned above. For example, further steps may relate, e.g., to specific steps of managing the enzyme formulation or combinations of such steps, preferably as indicated herein in the claims and/or the embodiments. Preferably, the method comprises, preferably before performing steps (ii) and (iii), an automated comparison step, wherein the comparison step comprises comparing temperature and/or storage duration values with a respective predefined value, wherein steps (ii) and (iii) are performed in accordance with the result of the comparison step, preferably wherein steps (ii) and (iii) are only executed if temperature and/or storage duration exceeds a respective predefined value. Preferably, the method is used in any process using a specified enzyme activity, e.g. for enzyme dosing, such as laundry processes, like in a washing machine, a dishwasher, or an industrial laundry machine, in food (e.g. milk, or meat) processing, in animal fed processing, in biofuel production, in leather production, in textile production, in pulp and paper industry, in beverage production, in enzymatic chemical production processes, in particular in "white" chemistry.

Moreover, the method may be preceded by steps establishing a model of enzyme stability, e.g. by a method for providing a stability model for an enzyme formulation, comprising e.g. the steps of (I) storing aliquots of an enzyme solution under at least three different values of at least one storage parameter, preferably storage temperature, (II) determining residual enzyme activity in said aliquots at least two non-identical points in time after start of storage, (III) modeling said non-identical points in time and said values of the storage parameter into a stability model, preferably based on the Arrhenius equation and/or on a Weibull model, preferably as specified herein below, and, thereby (IV) providing a stability model. Moreover, the data from the stability model may be provided in a database, preferably tangibly embedded into a data carrier, comprising an identification code for at least one enzyme formulation and, allocated thereto, at least the parameters required for determining a remaining activity value of an enzyme formulation. As will be understood by the skilled person, the aforesaid method for providing a stability model preferably precedes the computer-implemented method for activity based enzyme formulation management and, also preferably, is performed only once to establish the model and, preferably, include the required parameters into the aforesaid database.

Referring to the computer-implemented aspects of the invention, one or more of the method steps, preferably all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements of enzyme activity.

Specifically, further disclosed herein are:

- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment,
- wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

The devices and methods according to the present invention have several advantages over known methods for activity based enzyme formulation management. The use of a computer-implemented method, preferably automatically obtaining storage segments data, e.g. via a network, may allow to analyze a large amount of complex input data and may to deliver fast, reliable and accurate results.

As used in the following, the terms “have”, “comprise” or “include” or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions “A has B”, “A comprises B” and “A includes B” may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms “preferably”, “more preferably”, “most preferably”, “particularly”, “more particularly”, “specifically”, “more specifically” or similar terms are used in conjunction with optional features, without restricting further possibilities. Thus, features introduced by these terms are optional features and are not intended to restrict the scope of the claims in any way. The invention may, as the skilled person will recognize, be performed by using alternative features. Similarly, features introduced by “in an embodiment” or similar expressions are intended to be optional features, without any restriction regarding further embodiments of the invention, without any restrictions regarding the scope of the invention and without any restriction regarding the possibility of combining the features introduced in such way with other optional or non-optional features of the invention.

As used herein, if not otherwise indicated, the term “about” relates to the indicated value with the commonly accepted technical precision in the relevant field, preferably relates to the indicated value ±20%, more preferably ±10%, most preferably ±5%. Further, the term “essentially” indicates that deviations having influence on the indicated result or use are absent, i.e. potential deviations do not cause the indicated result to deviate by more than ±20%, more preferably ±10%, most preferably ±5%. Thus, “consisting essentially of” means including the components specified but excluding other components except for materials present as impurities, unavoidable materials present as a result of processes used to provide the components, and components added for a purpose other than achieving the technical effect of the invention. For example, a composition defined using the phrase “consisting essentially of” encompasses any known acceptable additive, excipient, diluent, carrier, and the like. Preferably, a composition consisting essentially of a set of components will comprise less than 5% by weight, more preferably less than 3% by weight, even more preferably less than 1%, most preferably less than 0.1% by weight of non-specified component(s).

The term “enzyme”, as used herein, includes, without limitation, any type of biological macromolecule having an activity as specified herein below. The enzyme, preferably, is a polypeptide or a nucleic acid, preferably RNA or DNA. More preferably, the enzyme is a polypeptide. Preferably, the enzyme is non-thermostable.

In a particular embodiment, the enzyme is an oxidoreductase (EC 1), a transferase (EC 2), a hydrolase (EC 3), a lyase (EC 4), an isomerase (EC 5), or a ligase (EC 6) (EC-numbering according to Enzyme Nomenclature, Recommendations (1992) of the Nomenclature Committee of the International Union of Biochemistry and Molecular Biology including its supplements published 1993-1999).

More preferably, the enzyme is a hydrolase (EC 3), preferably, a glycosidase (EC 3.2) or a peptidase (EC 3.4).

Especially preferred enzymes are enzymes selected from the group consisting of an amylase (in particular an alpha-amylase (EC 3.2.1.1)), a cellulase (EC 3.2.1.4), a lactase (EC 3.2.1.108), a mannanase (EC 3.2.1.25), a lipase (EC 3.1.1.3), a phytase (EC 3.1.3.8), a nuclease (EC 3.1.11 to EC 3.1.31), and a protease (EC 3.4); in particular an enzyme selected from the group consisting of amylase, protease, lipase, mannanase, phytase, xylanase, phosphatase, glucoamylase, nuclease, and cellulase, preferably, amylase or protease, preferably, a protease. Most preferred is a serine protease (EC 3.4.21), preferably a subtilisin protease.

In a particular preferred embodiment, the following proteins of interest are preferred:

Proteases

Enzymes having proteolytic activity are called "proteases" or "peptidases". Proteases are active proteins exerting "protease activity" or "proteolytic activity". Proteases are members of class EC 3.4. Proteases include aminopeptidases (EC 3.4.11), dipeptidases (EC 3.4.13), dipeptidyl-peptidases and tripeptidyl-peptidases (EC 3.4.14), peptidyl-dipeptidases (EC 3.4.15), serine-type carboxypeptidases (EC 3.4.16), metallocarboxypeptidases (EC 3.4.17), cysteine-type carboxypeptidases (EC 3.4.18), omega peptidases (EC 3.4.19), serine endopeptidases (EC 3.4.21), cysteine endopeptidases (EC 3.4.22), aspartic endopeptidases (EC 3.4.23), metallo-endopeptidases (EC 3.4.24), threonine endopeptidases (EC 3.4.25), endopeptidases of unknown catalytic mechanism (EC 3.4.99). Commercially available protease enzymes include but are not limited to Lavergy™ Pro (BASF); Alcalase®, Blaze®, Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® (Novozymes A/S), those sold under the tradename Maxatase®, Maxacal®, Maxapem®, Purafect®, Purafect® Prime, Purafect MA®, Purafect Ox®, Purafect OxP®, Puramax®, Properase®, FN2®, FN3®, FN4®, Excellase®, Eraser®, Ultimase®, Opticlean®, Effectenz®, Preferenz® and Optimase® (Danisco/DuPont), Axapem™ (Gist-Brocases N. V.), *Bacillus lentus* Alkaline Protease, and KAP (*Bacillus alkalophilus* subtilisin) from Kao.

At least one subtilisin may have SEQ ID NO:22 as described in EP 1921147, or is a variant thereof which is at least 80%, at least 90%, at least 95% or at least 98% identical SEQ ID NO:22 as described in EP 1921147 and has proteolytic activity. In one embodiment, a subtilisin is at least 80%, at least 90%, at least 95% or at least 98% identical to SEQ ID NO:22 as described in EP 1921147 and is characterized by having amino acid glutamic acid (E), or aspartic acid (D), or asparagine (N), or glutamine (Q), or alanine (A), or glycine (G), or serine (S) at position 101 (according to BPN' numbering) and has proteolytic activity. In one embodiment, subtilisin is at least 80%, at least 90%, at least 95% or at least 98% identical to SEQ ID NO:22 as described in EP 1921147 and is characterized by having amino acid glutamic acid (E) or aspartic acid (D), preferably glutamic acid (E), at position 101 (according to BPN' numbering) and has proteolytic activity.

The methods for determining proteolytic activity are well-known in the literature (see e.g. Gupta et al. (2002), Appl. Microbiol. Biotechnol. 60: 381-395). Proteolytic activity may be determined by using Succinyl-Ala-Ala-Pro-Phe-p-nitroanilide (Suc-AAPF-pNA, short AAPF; see e.g. DelMar et al. (1979), Analytical Biochem 99, 316-320) as substrate. pNA is cleaved from the substrate molecule by proteolytic cleavage, resulting in release of yellow color of free pNA which can be quantified by measuring OD405.

Amylases

Alpha-amylase (E.C. 3.2.1.1) enzymes may perform endohydrolysis of (1->4)-alpha-D-glucosidic linkages in polysaccharides containing three or more (1->4)-alpha-linked D-glucose units. Other examples of amylase enzymes include: Beta-amylase (E.C. 3.2.1.2), Glucan 1,4-alpha-maltotetraohydrolase (E.C. 3.2.1.60), Isoamylase (E.C. 3.2.1.68), Glucan 1,4-alpha-maltohexaosidase (E.C. 3.2.1.98), and Glucan 1,4-alpha-maltohydrolase (E.C. 3.2.1.133). Commercially available amylase enzymes include: Amplify®, Duramyl™, Termamyl™, Fungamyl™, Stainzyme™, Stainzyme Plus™, Natalase™, Liquozyme X and BAN™ (from Novozymes NS), and Rapidase™, Purastar™, Powerase™, Effectenz™ (M100 from DuPont), Preferenz™ (S1000, S110 and F1000; from DuPont), PrimaGreen™ (ALL; DuPont), Optisize™ (DuPont).

Lipases

"Lipases", "lipolytic enzyme", "lipid esterase", all refer to an enzyme of EC class 3.1.1 ("carboxylic ester hydrolase"). Lipases (E.C. 3.1.1.3, Triacylglycerol lipase) may hydrolyze triglycerides to more hydrophilic mono- and diglycerides, free fatty acids, and glycerol. Lipase enzymes usually includes also enzymes which are active on substrates different from triglycerides or cleave specific fatty acids, such as Phospholipase A (E.C. 3.1.1.4), Galactolipase (E.C. 3.1.1.26), cutinase (EC 3.1.1.74), and enzymes having sterol esterase activity (EC 3.1.1.13) and/or wax-ester hydrolase activity (EC 3.1.1.50).

Commercially available lipases include but are not limited to: Lipolase™, Lipex™, Lipolex™ and Lipoclean™ (Novozymes NS), Lumafast (originally from Genencor) and Lipomax (Gist-Brocades/now DSM).

The methods for determining lipolytic activity are well-known in the literature (see e.g. Gupta et al. (2003), Biotechnol. Appl. Biochem. 37, p. 63-71). E.g. the lipase activity may be measured by ester bond hydrolysis in the substrate para-nitrophenyl palmitate (pNP-Palmitate, C:16) and releases pNP which is yellow and can be detected at 405 nm.

Cellulases

"Cellulases", "cellulase enzymes" or "cellulolytic enzymes" are enzymes involved in hydrolysis of cellulose. Three major types of cellulases are known, namely endo-ss-1,4-glucanase (endo-1,4-P -D-glucan 4-glucanohydrolase, E.C. 3.2.1.4; hydrolyzing β-1,4-glucosidic bonds in cellulose), cellobiohydrolase (1,4-P-D-glucan cellobiohydrolase, EC 3.2.1.91), and ss-glucosidase (EC 3.2.1.21). Commercially available cellulase enzymes include are Celluzyme™, Endolase™ Carezyme™, Cellusoft™, Renozyme™, Celluclean™ (from Novozymes A/S), Ecostone™ Biotouch™, Econase™, Ecopulp™ (from AB Enzymes Finland), Clazinase™, and Puradax HA™, Genencor detergent cellulase L, IndiAge™ Neutra (from Genencor International Inc./DuPont), Revitalenz™ (2000 from DuPont), Primafast™ (DuPont) and KAC500™ (from Kao Corporation).

Cellulases according to the invention have "cellulolytic activity" or "cellulase activity". Assays for measurement of cellulolytic activity are known to those skilled in the art. For example, cellulolytic activity may be determined by virtue of the fact that cellulase hydrolyses carboxymethyl cellulose to reducing carbohydrates, the reducing ability of which is determined colorimetrically by means of the ferricyanide reaction, according to Hoffman, W. S., J. Biol. Chem. 120, 51 (1937).

Mannanases

Mannase (E.C. 3.2.1.78) enzymes hydrolyse internal β-1,4 bonds in mannose. Polymers. "Mannanase" may be an alkaline mannanase of Family 5 or 26. Mannanase enzymes are known to be derived from wild-type from *Bacillus* or *Humicola*, particularly *B. agaradhaerens, B. licheniformis, B. halodurans, B. clausii* or *H. insolens.*

Commercially available mannanase enzymes include: Mannaway® (Novozymes AIS).

Pectate Lyases

Pectate lyase (E.C. 4.2.2.2) enzymes eliminative cleavage of (1->4)-alpha-D-galacturonan to give oligosaccharides with 4-deoxy-alpha-D-galact-4-enuronosyl groups at their non-reducing ends. Commercially available pectate lyase enzymes include: Xpect™, Pectawash™ and Pectaway™ (Novozymes A/S); PrimaGreen™, EcoScour (DuPont).

Nucleases

Nuclease (EC 3.1.21.1) also known as Deoxyribonuclease I or DNase preforms endonucleolytic cleavage to 5'-phosphodinucleotide and 5'-phosphooligonucleotide end-products.

The "activity" of an enzyme, as referred to herein, is a catalytic activity, preferably as specified herein above for the various types of enzymes. More preferably, the activity is a hydrolase activity, an oxidoreductase activity, a transferase activity, a lyase activity, an isomerase activity, a ligase activity, or a translocse activity, more preferably a hydrolase activity, more preferably a proteolytic, a lipolytic, an amylolytic activity, a cellulolytic activity, a mannanolytic activity, or a saccharolytic activity. More preferably, the enzyme is a protease and has proteolytic activity. The term activity, as the skilled person will understand, may relate to the specific activity, i.e. the activity per mass unit, e.g. units/mg protein. The activity may, however, be a volume activity, i.e. the activity per volume of enzyme solution, e.g. units/ml solution; moreover, activity may also be the absolute activity, i.e. the activity comprised in a given formulation, e.g. units. As will be understood by the skilled person, a decrease in activity, preferably is a decrease in specific activity; Preferably, with an unchanged amount of formulation, this will correlate with a decrease in absolute activity; and, with an unchanged dilution, will also correlate with a decrease in volume activity. Thus, provided total amount of formulation and/or dilution are not modified, decrease in activity may be determined as a total, activity, a volume activity, or specific activity. Preferably, activity is determined as specific activity and/or absolute activity, more preferably as specific activity. In accordance, an "initial enzyme activity value" is an activity value of an enzyme formulation determined at or before start of storage, preferably before the first storage segment; more preferably determined shortly before start of storage, e.g. at most 10 days before start of storage, preferably at most 5 days before start of storage, more preferably at most 2 days before start of storage, most preferably at most 1 day before start of storage. Means and methods for determining an initial enzyme activity value are known to the skilled person. Preferably, the initial enzyme activity value is determined by an enzymatic assay testing the activity of the enzyme. Also in accordance, the term "remaining activity value", as used herein, relates to an activity value of an enzyme formulation determined at or after the end of storage, preferably after the last storage segment; more preferably the remaining activity value is determined shortly before deciding on and/or applying at least one management measure as specified elsewhere herein, e.g. at most 10 days, preferably at most 5 days, more preferably at most 2 days, most preferably at most 1 day before deciding on and/or applying at least one management measure. Means and methods for determining a remaining activity value are described herein below and in the Examples.

The term "enzyme formulation", as used herein, includes, without limitation, any type of formulation comprising at least one enzyme having an activity. Thus, the formulation may be liquid or solid, may be a solution, an emulsion, a suspension, a sol, a gel, or a solid. Preferably, the formulation is a solution, an emulsion, or a suspension, more preferably is a solution. Preferably, the formulation comprises additional compounds in addition to the enzyme, in particular buffer compounds, salts, stabilizers, solvents, and the like. Also preferably, the enzyme formulation is an enzyme solution, preferably an aqueous solution, more preferably a buffered solution. Thus, preferably, the enzyme formulation further comprises water. The enzyme formulation may comprise more than one enzyme and/or more than one activity, i.e. may comprise a plurality of enzymes and/or activities which may be affected by storage segments differently. Preferably, in such case, the management measures are based on the enzyme and/or activity showing the strongest decrease in activity; more preferably, the management measures are based on the activity showing the strongest decrease in such case. The formulation may, however, be a culture medium, preferably a culture supernatant with cells removed, more preferably a fermentation broth, still more preferably a cell-free fermentation broth. The enzyme may be partly or fully purified from a culture medium, more preferably a fermentation broth.

The term "enzyme formulation management", as used herein, relates to any measure relating to further use of an enzyme formulation, the term "activity-based" indicating that the decision on the further measure is taken taking into account the activity of the enzyme formulation, in particular the remaining activity as specified herein below. Depending on the remaining activity, management of an enzyme formulation may include use as planned, use at a modified dosage (e.g. at a higher volume to compensate for loss in volume activity) or recommending such a use at a higher dosage, use for a different purpose (e.g. a purpose allowing lower specific and/or volume activities), readjusting a residual shelf life indicator (e.g. a use by, or a best before date) or may even be discarding and/or returning to the manufacturer the enzyme formulation. Moreover, the management may include ordering an additional and/or fresh batch of the enzyme formulation, e.g. in case it is determined that the absolute activity of the batch received is too low for the planned purpose. Moreover, the management may include eliciting quality control measures adapted to avoid activity decrease for further batches, such as improvement in shipping conditions, in particular shipping duration and/or shipping temperature, but also e.g. improvements in packaging or including pre-purification steps and/or conservation measures before shipping. In a preferred embodiment, enzyme formulation management is management of an enzyme formulation having been exposed to a multitude of, i.e. preferably at least two, more preferably at least three, even more preferably at least five, non-identical storage segments differing at least in temperature.

The term "storage segment", as used herein, relates to any sub-section of a storage history of an enzyme formulation. Preferably, the storage segment is a shipment segment, e.g. segments may be any of storage at the manufacturer site, shipping via ship, ship, and/or plane, storage at customs, and/or storage at recipient's site. A storage segment may, however, also be a temperature segment, i.e., preferably, a segment of essentially constant temperature affecting the enzyme formulation for a time period. Preferably, the shipment segments correlate with the temperature segments. In a preferred embodiment, the storage segment is non-temperature controlled, is temperature controlled within a specific target range, or is controlled such as not to exceed a pre-determined reference value. Thus, preferably, in at least one storage segment, the temperature affecting the enzyme formulation for said time period is not controlled. More preferably, in at least two, still more preferably at least threes, even more preferably at least five, most preferably all, storage segments, the temperature affecting the enzyme formulation for said time period is not adjusted. Even more preferably, the enzyme formulation is not cooled and/or heated during at least one, preferably at least two, even more preferably at least three, still more preferably at least five, most preferably all, storage segment(s).

In accordance, the term "storage segment data", as used herein, are data allocated to a specific storage segment. Preferably, the storage segment data at least comprise data on duration and temperature of the storage segment. Measures and devices for determining temperature acting on a specific object such as an enzyme formulation and its duration, in particular appropriate sensors, are known in the art. Thus, preferably, the storage segment data is determined based on sensor data. Preferably, the sensor data is recorded using a sensor in close proximity or within the enzyme formulation during at least one storage segment, preferably during the complete storage term. Also preferably, the sensor is located within the same storage space as the enzyme formulation and/or is attached to a packaging, a pallet, or an outer shell of a container of the enzyme formulation; preferably, in such case, the sensor data is corrected, specifically by one or both of the receiving unit and the processing unit as specified herein below, by calculating the temperature within the enzyme formulation, preferably by taking into account heat conductivity, in particular based on mass and heat capacity of the enzyme formulation. More preferably, the sensor data is received, specifically by one or both of the receiving unit and the processing unit, from at least one sensor located within the enzyme formulation. Preferably, storage segment data are determined and provided semi-quantitatively or quantitatively, more preferably quantitatively. Semi-quantitative determination and provision of storage segment data may comprise reporting temperature and/or duration as a category, e.g. low (e.g. <15° C.), medium (15° C. temperature 35° C.), and high (>35° C.) for temperature, and e.g. short (<1 h), medium (1 h duration 1 day), and long (>1 day) for duration. Quantitative determination and provision of storage segment data preferably comprises reporting temperature and/or duration in appropriate graduations, e.g. preferably, 1° C. graduation for temperature and 1 min or 1 h graduation for duration. As the skilled person understands, for long (preferably >5 min, >15 min, or >30 min) storage segments, preferably an average temperature is determined and reported. Preferably, storage segment data may also be determined by determining a surrogate marker correlating with temperature and duration of a storage segment, e.g. using a temperature sensitive dye changing color with increasing temperature and/or duration, Or, in case the enzyme formulation comprises more than one activity, using one activity as a surrogate marker for one or more activities comprised in the formulation.

The term "input data" as used herein is a broad term and is to be given its ordinary and customary meaning to a person of ordinary skill in the art and is not to be limited to a special or customized meaning. The term preferably refers to at least storage segment data as specified herein above and to an initial enzyme activity value. Preferably, input data comprises further data, preferably data identifying the enzyme formulation and/or providing essential parameters and an identifier for the stability model applicable to the enzyme formulation in question. Thus, in case the Arrhenius equation as specified herein below shall be used as an enzyme stability model, preferably parameters $A_0$, $k_0$, and $E_a$, are provided as input data; or preferably, in case a Weibull model shall be used as an enzyme stability model, preferably parameters $A_0$, $k_0$, $E_a$, and n are provided as input parameters. As the skilled person will understand, the input data may also comprise the equation(s) of the stability model itself, preferably including all essential parameters. It is, however, also envisaged that a stability model, preferably including enzyme formulation-specific parameters, is comprised in the device into which the method is implemented, e.g. in a memory unit operably connected to the processing unit; as will be understood by the skilled person, in case the device comprises models and/or parameters for more than one enzyme formulation, the input data preferably comprise an identifier of the enzyme formulation enabling the processing unit to use the correct stability model and parameters. In a preferred embodiment, the input data further comprise a time-varying temperature parameter. Thus, in a preferred embodiment, input data comprise storage segment data from a multitude, preferably at least two, more preferably at least three, even more preferably at least five, storage segments of non-identical storage temperature, and, more preferably, said storage segment data from said non-identical storage segments comprise a time-varying temperature parameter.

The term "input unit", as used herein, includes without limitation any item or element forming a boundary configured for transferring information. In particular, the input unit may be configured for transferring information onto a computational device, e.g. onto a computer, such as to receive information. The input unit preferably is a separate unit configured for receiving or transferring information onto a computational device, e.g. one or more of: an interface, specifically a web interface and/or a data interface; a keyboard; a terminal; a touchscreen, or any other input device deemed appropriate by the skilled person. More preferably, the input unit comprises or is a data interface configured for transferring or exchanging information as specified herein below.

The term "output unit", as used herein, includes without limitation any item or element forming a boundary configured for transferring information. In particular, the output unit may be configured for transferring information from a computational device, e.g. a computer, such as to send or output information, e.g. onto another device or to a user. The output unit preferably is a separate unit configured for outputting or transferring information from a computational device, e.g. one or more of: an interface, specifically a web interface and/or a data interface; a screen, a printer, or a touchscreen, or any other output device deemed appropriate by the skilled person. More preferably, the output unit comprises or is a data interface configured for transferring or exchanging information as specified herein below.

Preferably, the input unit and the output unit are configured as at least one or at least two separate data interface(s); i.e. preferably, provide a data transfer connection, e.g. a wireless transfer, an internet transfer, Bluetooth, NFC, inductive coupling or the like. As an example, the data transfer connection may be or may comprise at least one port comprising one or more of a network or internet port, a USB-port and a disk drive. The input unit and/or the output unit may also be may be at least one web interface.

The term "processing unit" as used herein is a broad term and is to be given its ordinary and customary meaning to a person of ordinary skill in the art and is not to be limited to a special or customized meaning. The term specifically may refer, without limitation, to an arbitrary logic circuitry configured for performing operations of a computer or system, and/or, generally, to a device or unit thereof which is configured for performing calculations or logic operations. The processing unit may comprise at least one processor. In particular, the processing unit may be configured for processing basic instructions that drive the computer or system. As an example, the processing unit may comprise at least one arithmetic logic unit (ALU), at least one floating-point unit (FPU), such as a math coprocessor or a numeric coprocessor, a plurality of registers and a memory, such as a cache memory. In particular, the processing unit may be a multi-core processor. The processing unit may comprise a Central Processing Unit (CPU) and/or one or more Graphics Processing Units (GPUs) and/or one or more Application Specific Integrated Circuits (ASICs) and/or one or more Tensor Processing Units (TPUs) and/or one or more field-programmable gate arrays (FPGAs) or the like. The processing unit may be configured for pre-processing the input data. The pre-processing may comprise at least one filtering process for input data fulfilling at least one quality criterion. For example, the input data may be filtered to remove missing variables. Preferably, input data may be compared to at least one pre-defined threshold value, e.g. a threshold temperature, to determine whether method step (ii) is required to be performed at all. Preferably, the processing unit is configured to perform a determination, preferably calculation, of a remaining enzyme activity as specified elsewhere herein. Methods for determining a remaining activity value of an enzyme formulation based on the storage segment data and the initial enzyme activity value are in principle known in the art. Preferably, said determining is based on previously established experimental data on the decrease of the activity of the enzyme formulation in question in dependence on temperature and/or time. Preferably, the experimental data are condensed into a model of enzyme stability. More preferably, the experimental data are modeled into at least two models of enzyme stability, the prediction accuracy of the two models is compared, and the model providing accuracy prediction of the stability of the enzyme formulation in question is selected for the determining step of the computer-implemented method for activity based enzyme formulation management, i.e. preferably step (ii) of the method.

Preferably, the model for enzyme stability comprises, more preferably is, the Arrhenius equation; thus, the stability model preferably comprises equation (I)

$$A(t, T) = A_0 \cdot \exp\left(-k_0 \exp\left(-\frac{E_a}{R}\left(\frac{1}{T} - \frac{1}{T_{ref}}\right)\right)t\right) \tag{I}$$

With the following definitions:

A(t,T)=remaining enzyme activity after storage time t at temperature T;

$A_0$=initial enzyme activity;

t=time, i.e. storage duration at temperature T;

T=storage temperature (in Kelvin)

R=8.314 J/(K mol), i.e. universal gas constant;

$E_a$=activation energy $k_0$=frequency factor $T_{ref}$=reference temperature for frequency factor k0.

Preferably, Trey is e.g. set arbitrarily to a value of 318.15 K (45° C.) and has no influence on fit or prediction. Also preferably, the parameters indicated in bold in formula (I) (i.e. $A_0$, $k_0$, and $E_a$) indicate fit parameters. Also preferably, if experimental data were provided for single temperature only, the activation energy $E_a$ cannot be estimated; in this case, $E_a$=0 may be defined formally, so that the resulting A(t,T) is independent of T.

In the case of a storage scenario with non-constant, i.e., time-varying, temperature T, model equation (I) is generalized to $$A(t, \{T(\tau), \tau \in \{0, t]\}) = A_0 \cdot \exp\left(-\int_0^t k_0 \exp\left(-\frac{E_a}{R}\left(\frac{1}{T(\tau)} - \frac{1}{T_{ref}}\right)\right)d\tau\right)$$

More preferably, the model for enzyme stability comprises, more preferably is, at least one Weibull-type equation, still more preferably at least one temperature-dependent Weibull type equation. Also more preferably, the stability model comprises, more preferably is, a Weibull-model, still more preferably a temperature-dependent Weibull model.

In a preferred embodiment, the stability model comprises a time-varying temperature parameter T(τ) preferably incorporates the effect of a time-varying temperature into the model. In accordance, the stability model preferably (i) enables prediction of degradation in case of time-varying storage temperatures, preferably in case at least one storage segment is a storage segment in which storage temperature is not controlled; (i) uses a single set of parameter values for all temperatures over all storage segments only; and/or (iii) enables use of experimental data with non-constant temperature profiles for establishing the stability model for an enzyme of interest.

Thus, the stability model preferably comprises equation (II)

$$A(t, T) = A_0 \cdot \exp\left(-\left[k_0 \exp\left(-\frac{E_a}{R}\left(\frac{1}{T} - \frac{1}{T_{ref}}\right)\right)t\right]^n\right) \tag{II}$$

with the same definitions as provided above for formula (I) and the additional definition n=Weibull parameter.

Preferably, $T_{ref}$ is e.g. set arbitrarily to a value of 318.15 K (45° C.) and has no influence on fit or prediction. Also preferably, the parameters indicated in bold in formula (II) (i.e. $A_0$, $k_0$, $E_a$, and n) indicate fit parameters. Also preferably, if experimental data were provided for single temperature only, the activation energy $E_a$ cannot be estimated; in this case, $E_a=0$ may be defined formally, so that the resulting A(t,T) is independent of T.

In the case of a storage scenario with non-constant, i.e., time-varying, temperature T, model equation (II) is generalized to $$A(t, \{T(\tau), \tau \in \{0, t\}\}) = A_0 \cdot \exp\left(-\int_0^t n\left[k_0 \exp\left(-\frac{E_a}{R}\left(\frac{1}{T(\tau)} - \frac{1}{T_{ref}}\right)\right)\right]^n \tau^{n-1} d\tau\right)$$

As the skilled person will understand, other enzyme stability models may be used, e.g. first-order kinetic models, distinct isoenzyme models, two-fraction models, and/or fractional conversation models (referenced e.g. in Sant'Anna et al. (2013); Bioprocess Biosyst Eng 36:993).

Advantageously, it was found in the work underlying that by using enzyme stability models, the remaining activity of an enzyme formulation after storage can be exactly be predicted and management of the enzyme formulation can be adjusted accordingly. Preferably, it was found that all Weibull-type degradation models in the literature refer to a fixed temperature only, and the advantage of using a temperature-dependent extension is (i) that a temperature-dependent model allows for a prediction of degradation in case of time-varying storage temperatures, which is particularly advantageous in shipping scenarios without strict temperature control; (ii) that even in the case of time-constant temperature, the above model is advantageous, as it requires a single set of parameter values for all temperatures only, which is in contrast to temperature-independent models, which require a separate parameter set for each temperature value of interest; therefore, a temperature-dependent model requires less experimental data points to reliably fit the model parameters for usage in scenarios with time-constant (but variable) temperatures; and (iii) that experiments with non-constant temperature profiles can be used for parameter identification.

The definitions made above apply mutatis mutandis to the following. Additional definitions and explanations made further below also apply for all embodiments described in this specification mutatis mutandis.

The present invention further relates to an apparatus for activity based enzyme formulation management of an enzyme formulation, comprising:

- an input unit configured to receive a data input, preferably a user interface, wherein the data input comprises storage segment data defined by at least temperature and duration and an initial enzyme activity value of said enzyme formulation;
- a processing unit, preferably a processing unit comprising at least one processor, configured, specifically by programming, to determine, specifically to calculate, a remaining activity value of the enzyme formulation based on the storage segment data and the initial enzyme activity value; and
- an output unit configured to output the remaining activity value for the enzyme formulation to the user and/or to a data interface.

The term "apparatus", as used herein, relates to a system of means comprising at least the aforementioned means operatively linked to each other as to allow the determination. Typical input and output units and means for carrying out the determination, in particular processing units, are disclosed above in connection with the methods of the invention. How to link the means in an operating manner will depend on the type of means included into the device. The person skilled in the art will realize how to link the means without further ado. Preferably, the means are comprised by a single apparatus. Typical apparatuses are those which can be applied without the particular knowledge of a specialized technician, in particular hand-held devices comprising an executable code, in particular an application, performing the determinations as specified elsewhere herein. The results may be given as output of raw data which need interpretation e.g. by a technician. More preferably, the output of the apparatus is, however, processed, i.e. evaluated, raw data, the interpretation of which does not require a technician. Also preferably, some functions of activity based enzyme formulation management may be performed automatically, i.e. preferably without user interaction, e.g. adjustment of a dosage of the enzyme formulation, or eliciting an order of a batch of enzyme formulation if the remaining activity value is indicative of the total enzyme activity in the enzyme formulation being below a predetermined threshold value. Further typical devices comprise the units, in particular the input unit, the processing unit, and the output unit referred to above in accordance with the method of the invention.

The input unit of the device may be configured to retrieve input data from a local storage device, e.g. a USB storage device or a sensor having stored storage segment data during storage and/or transport. The input device may, however, also receive input data from an external data storage means or directly from a sensor, e.g. via a data connection such as the internet.

The apparatus preferably is a handheld device or any type of computing device having the features as specified. The apparatus may, however, also be an apparatus configured to make use of an enzyme formulation, more preferably a washing machine, a dishwasher, an industrial laundry machine, a food (e.g. milk, or meat) processing machine, an animal fed processing machine, a biofuel production machine, a leather production machine, a textile production machine, a pulp and paper production machine, a beverage production machine, or a chemical production machine, in particular in "white" chemistry. The apparatus configured to make use of an enzyme formulation, preferably, further comprises a container unit configured to store an enzyme formulation; and a dosage unit configured to dose an amount of the enzyme formulation comprised in the container unit during a wash cycle based on the remaining activity value determined by the processing unit.

In addition to the enzyme formulation management measures as specified herein above, the apparatus preferably is configured to further perform at least one of:

- download relevant information including quality information, regulatory information, safety data, and/or technical documents;
- order enzyme formulations; and/or
- provide a user-feedback including usability, information content and/or enzyme formulation outcome.

The present invention also relates to a system for providing activity based enzyme inventory management of an enzyme formulation, comprising:

- an apparatus according to the present invention; and
- a web server configured to interface with a user via a webpage served by the web server and/or an application program;

wherein the system is configured to provide a graphical user interface (GUI) to a user by the webpage and/or the application program.

The term "system" as used herein is a broad term and is to be given its ordinary and customary meaning to a person of ordinary skill in the art and is not to be limited to a special or customized meaning. The term includes, without limitation, any a setup having at least two interacting components. Specifically, the term may include any type of system comprising the components as specified. Preferably, the apparatus comprised in the system is an apparatus as specified herein above. Preferably, the apparatus is a computing device comprising a data interface as an input unit and as an output unit. Thus, preferably, the apparatus comprised in the system preferably is configured to receive input data from an external data storage means or directly from a sensor, e.g. via a data connection such as the internet.

The system is configured to output a remaining enzyme activity value to an external data storage means and/or processing device, preferably a handheld device or remote computing device, via a web server configured to interface with a user via a webpage served by the web server and/or via an application program, wherein the system is configured to provide a graphical user interface (GUI) to a user by the webpage and/or the application program. Thus, preferably, the server is configured to provide a graphical user interface (GUI) to a user by the webpage and/or the application program. The term "graphical user interface" is known to the skilled person to relate to a user interface allowing a user to interact with an electronic device, in particular an apparatus or other computing device, through visual indicators instead of text-based user interaction, such as typed commands or text navigation. Also the term "application program" abbreviated as "application" or "App", is also known to the skilled person as a computer executable code, in particular a software program providing a graphical user interface for a computing device function or a specific application of a computing device. Preferably, the application program is an executable code opening the web page served by the apparatus as specified elsewhere herein, preferably on a handheld device.

As the skilled person will understand in view of the present description, the web server may serve the remaining activity value of an enzyme formulation as such; the web server may, however, also provide all parameters required to determine a remaining enzyme activity. Thus, the web server, preferably, serves to a user at at least one of

- a storage segment data, defined by at least temperature and duration, and an initial enzyme activity value of said enzyme formulation;
- the parameters required for determining a remaining activity value of an enzyme formulation, preferably of a stability model as specified herein above, and an initial enzyme activity value of said enzyme formulation; and
- a remaining activity value of the enzyme formulation, preferably determined according to the method according to the present invention.

The present invention also relates to a computer program comprising instructions which, when the program is executed by the apparatus of the present invention, specifically by a processor of the apparatus, and/or by the system of the present invention, cause the apparatus and/or the system to perform the method of the present invention.

The present invention also relates to a computer-readable storage medium comprising instructions which, when executed by the apparatus of any one of the present invention and/or the system of any one of the present invention, cause the apparatus and/or the system to perform the method of the present invention.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

The present invention also relates to a use of a computer-implemented method according to the present invention and/or a remaining activity value of an enzyme formulation determined according to the method according the present invention in a washing machine, preferably for determining dosing of said enzyme formulation; and to a use of a computer-implemented method according to the present invention in industrial cleaning applications.

The present invention further relates to a method for manufacturing a product comprising an enzyme formulation at a pre-defined activity, comprising the steps of the method for activity based enzyme formulation management of the present invention and the further step of automatically adjusting dosing of said enzyme formulation based on the remaining activity value of the enzyme formulation.

The term "product comprising an enzyme formulation" as used herein is a broad term and is to be given its ordinary and customary meaning to a person of ordinary skill in the art and is not to be limited to a special or customized meaning. In particular, the term includes any type of product comprising an enzyme formulation, preferably comprising a pre-defined enzyme activity. Preferably, the product is a product for use in home or industrial cleaning applications, more preferably is a cleaning agent or component thereof.

In view of the above, the following embodiments are particularly envisaged:

Embodiment 1. A computer-implemented method for activity based enzyme formulation management of an enzyme formulation comprising

- (i) receiving input data, preferably via an input unit, of at least one storage segment data defined by at least temperature and storage duration and an initial enzyme activity value of said enzyme formulation;
- (ii) determining, specifically calculating, a remaining activity value of the enzyme formulation based on the storage segment data and the initial enzyme activity value via a processing unit;
- (iii) providing a remaining activity value for the enzyme formulation, preferably via an output unit, and
- (iv) managing said enzyme formulation based on the remaining activity value of step (iii).

Embodiment 2. The computer-implemented method of embodiment 1, wherein step (iv) comprises providing a dosage recommendation based on the remaining activity value of the enzyme formulation, preferably via an output unit.

Embodiment 3. The computer-implemented method of embodiment 1 or 2, wherein step (iv) comprises providing a residual shelf life indicator for said enzyme formulation based on the remaining activity value of the enzyme formulation.

Embodiment 4. The computer-implemented method of any one of embodiments 1 to 3, wherein step (iv) comprises automated adjustment of a dosage of the enzyme formulation by controlling of a dosing equipment.

Embodiment 5. The computer-implemented method of any one of embodiments 1 to 4, wherein step (iv) comprises eliciting an order of a batch of enzyme formulation if the remaining activity value is indicative of the total enzyme activity in the enzyme formulation being below a pre-determined threshold value.

Embodiment 6. The computer-implemented method of any one of embodiments 1 to 5, wherein the at least one storage segment data is determined based on sensor data.

Embodiment 7. The computer-implemented method of embodiment 6, wherein the sensor data is received from a sensor in close proximity or within the enzyme formulation during at least one storage segment, preferably during the complete storage term.

Embodiment 8. The computer-implemented method of embodiment 7, wherein said sensor is located within the same storage space as the enzyme formulation and/or is attached to a packaging, a pallet, or an outer shell of a container of the enzyme formulation.

Embodiment 9. The computer-implemented method of any one of embodiments 6 to 8, wherein the sensor data is corrected, specifically by one or both of the receiving unit and the processing unit, by calculating the temperature within the enzyme formulation, preferably by taking into account heat conductivity, in particular based on mass and heat capacity of the enzyme formulation.

Embodiment 10. The computer-implemented method of any one of embodiments 6 to 9, wherein the sensor data is received, specifically by one or both of the receiving unit and the processing unit, from at least one sensor located within the enzyme formulation.

Embodiment 11. The computer-implemented method of any one of embodiments 6 to 10, wherein the method comprises, preferably before performing steps (ii) and (iii), an automated comparison step, wherein the comparison step comprises comparing temperature and/or storage duration values with a respective predefined value, wherein steps (ii) and (iii) are performed in accordance with the result of the comparison step, preferably wherein steps (ii) and (iii) are only executed if temperature and/or storage duration exceeds a respective predefined value.

Embodiment 12. An apparatus for activity based enzyme formulation management of an enzyme formulation, comprising:

- an input unit configured to receive a data input, preferably a user interface, wherein the data input comprises storage segment data defined by at least temperature and duration and an initial enzyme activity value of said enzyme formulation;
- a processing unit, preferably a processing unit comprising at least one processor, configured, specifically by programming, to determine, specifically to calculate, a remaining activity value of the enzyme formulation based on the storage segment data and the initial enzyme activity value preferably according to the computer-implemented method according to any one of embodiments 1 to 11 or 22 to 25; and
- an output unit configured to output the remaining activity value for the enzyme formulation to the user and/or to a data interface.

Embodiment 13. The apparatus according to embodiment 13, further configured to perform at least one of the following:

- output, preferably print, the value of the remaining activity value of the enzyme formulation via the output unit;
- determine by the processing unit and output via the output unit a residual shelf life value of the enzyme formulation;
- determine by the processing unit and output via the output unit a dosage instruction for the enzyme formulation; and/or
- automatically elicit an order of an an additional batch of enzyme formulation if the remaining activity value indicates that the total enzyme activity in the enzyme formulation is below a pre-determined threshold value.

Embodiment 14. The apparatus according to embodiment 13, further configured to:

- download relevant information including quality information, regulatory information, safety data, and/or technical documents;
- order enzyme formulations; and/or
- provide a user-feedback including usability, information content and/or enzyme formulation outcome.

Embodiment 15. The apparatus according to any one of embodiments 12 to 14, wherein said apparatus is a washing machine and further comprises

- a container unit configured to store an enzyme formulation; and
- a dosage unit configured to dose an amount of the enzyme formulation comprised in the container unit during a wash cycle based on the remaining activity value determined by the processing unit.

Embodiment 16. A system for providing activity based enzyme inventory management of an enzyme formulation, comprising:

- an apparatus according to any one of embodiments 12 to 15; and
- a web server configured to interface with a user via a webpage served by the web server and/or via an application program;

wherein the system is configured to provide a graphical user interface (GUI) to a user by the webpage and/or the application program.

Embodiment 17. The system of embodiment 16, wherein said web server serves to the user at least one of

- a storage segment data, defined by at least temperature and duration, and an initial enzyme activity value of said enzyme formulation;
- the parameters required for determining a remaining activity value of an enzyme formulation and an initial enzyme activity value of said enzyme formulation; and
- a remaining activity value of the enzyme formulation, preferably determined according to the method according to any one of embodiments 1 to 11 or 22 to 25.

Embodiment 18. A computer program comprising instructions which, when the program is executed by the apparatus of any one of embodiments 12 to 15, specifically by a processor of the apparatus, and/or by the system of any one of embodiments 16 or 17, cause the apparatus and/or the system to perform the method of any one of embodiments 1 to 11 or 22 to 25.

Embodiment 19. A computer-readable storage medium comprising instructions which, when executed by the apparatus of any one of embodiments 12 to 15 and/or the system of any one of embodiments 16 or 17, cause the apparatus and/or the system to perform the method of any one of embodiments 1 to 11 or 22 to 25.

Embodiment 20. Use of a computer-implemented method according to any of embodiments 1 to 11 and/or a remaining activity value of an enzyme formulation determined according to the method according to any one of embodiments 1 to 11 or 22 to 25 in a washing machine, preferably for determining dosing of said enzyme formulation.

Embodiment 21. Use of a computer-implemented method according to any of embodiments 1 to 11 or 22 to 25 in an industrial application, preferably in a laundry processes, in food processing, in animal fed processing, in biofuel production, in leather production, in textile production, in pulp and paper industry, in beverage production, and/or in enzymatic chemical production processes.

Embodiment 21. Method for manufacturing a product comprising an enzyme formulation at a pre-defined activity, comprising the steps of the method of any one of embodiments 1 to 11 or 22 to 25 and the further step of automatically adjusting dosing of said enzyme formulation based on the remaining activity value of the enzyme formulation.

Embodiment 22: The computer-implemented method of any one of embodiments 1 to 11, wherein said enzyme formulation is exposed to a multitude of non-identical storage segments differing at least in temperature.

Embodiment 23. The computer-implemented method of any one of embodiments 1 to 11 or 22, wherein at the temperature of at least one storage segment is not controlled.

Embodiment 24. The computer-implemented method of any one of embodiments 1 to 11, 22, or 23, wherein in step (ii) the remaining activity value of the enzyme formulation is calculated based on a model comprising a time-varying temperature parameter.

Embodiment 25. The computer-implemented method of any one of embodiments 1 to 11 or 22 to 24, wherein said model comprises at least one temperature-dependent Weibull type equation.

All references cited in this specification are herewith incorporated by reference with respect to their entire disclosure content and the disclosure content specifically mentioned in this specification.

FIGURE LEGENDS

FIG. 1: Device/system

Figure 2:
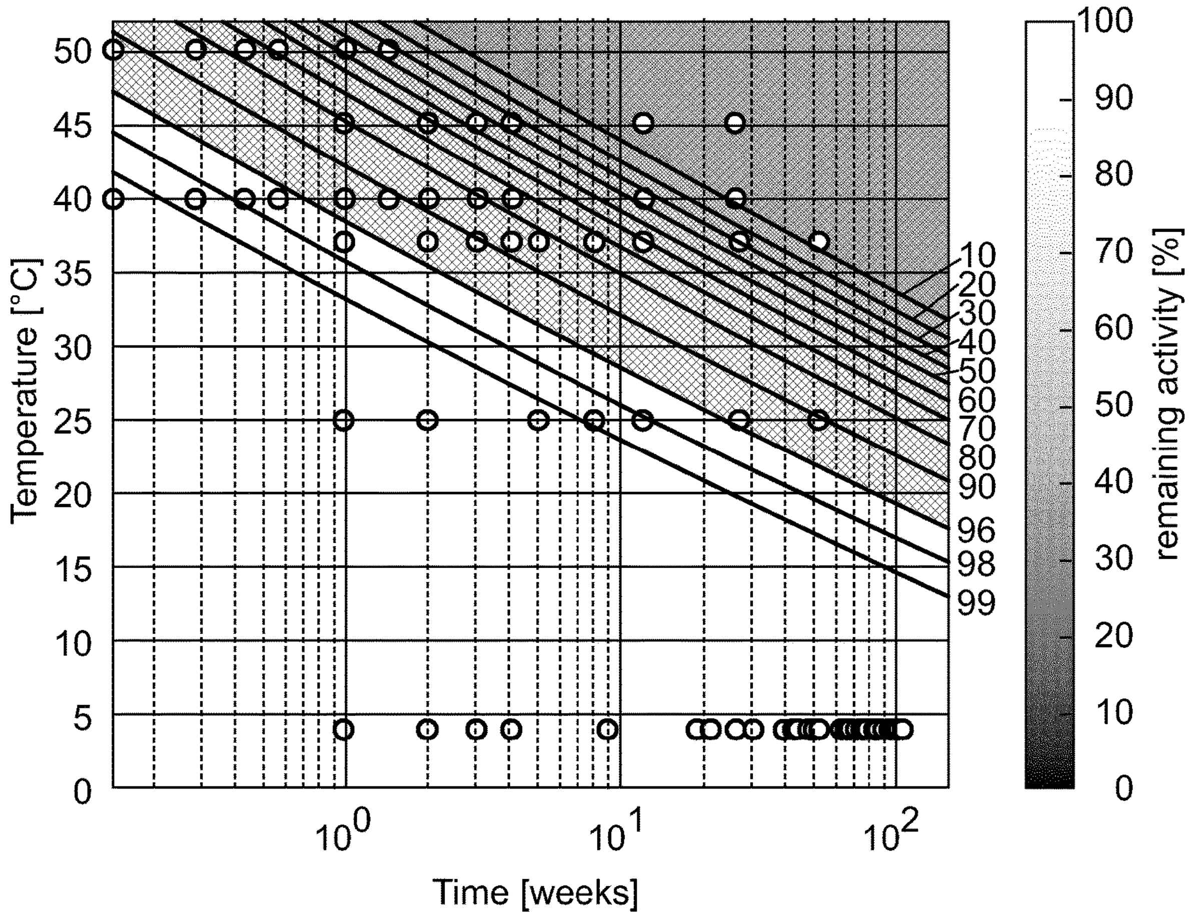

FIG. 2: Fit of enzyme activity data into a Weibull model; x-axis: time; y-axis: storage temperature; remaining activity is shown in greyscale shading.

Figure 3:
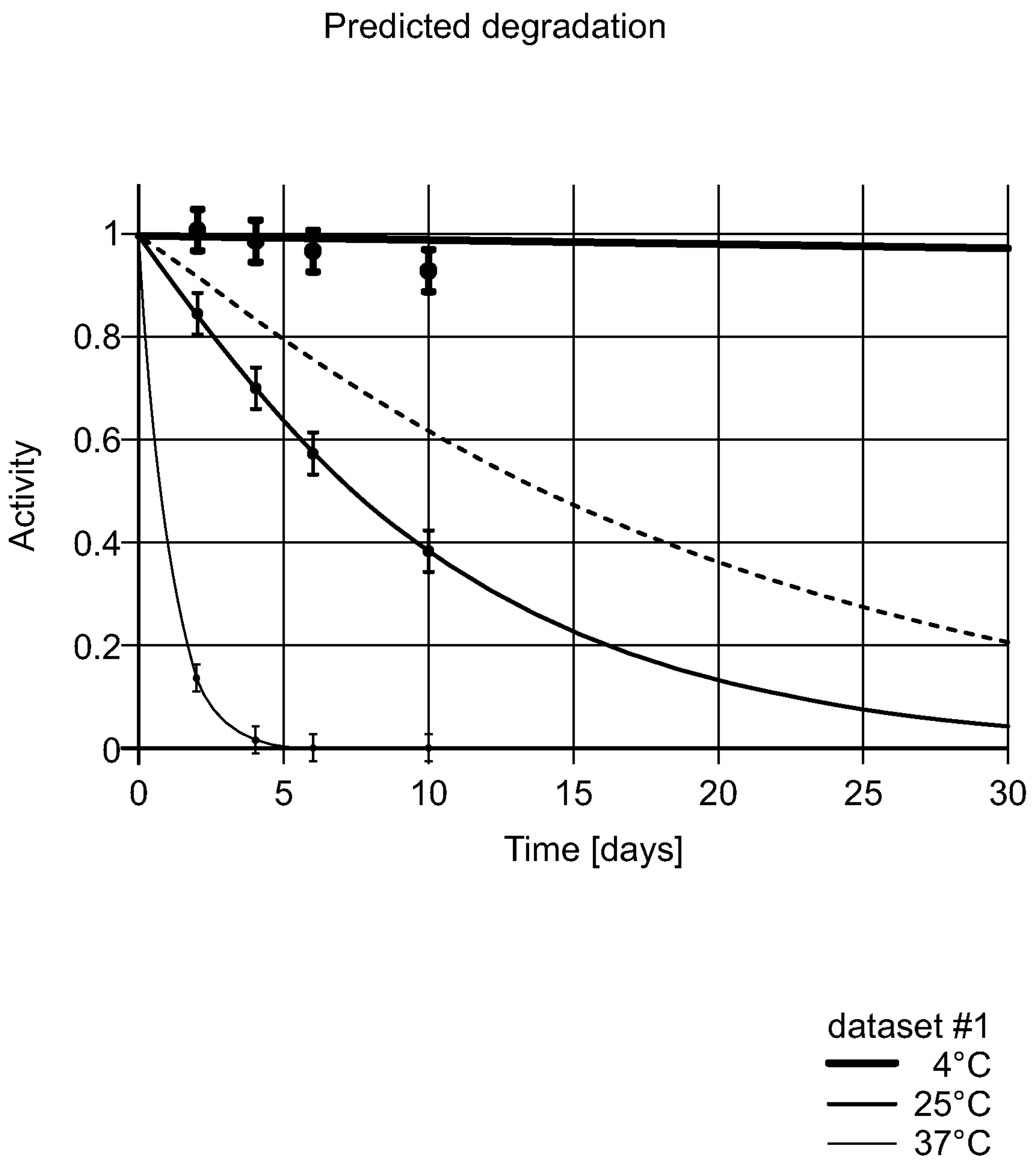

FIG. 3: Exemplary embodiment of a web-based user interface for prediction of remaining enzyme activity.

Figure 4:
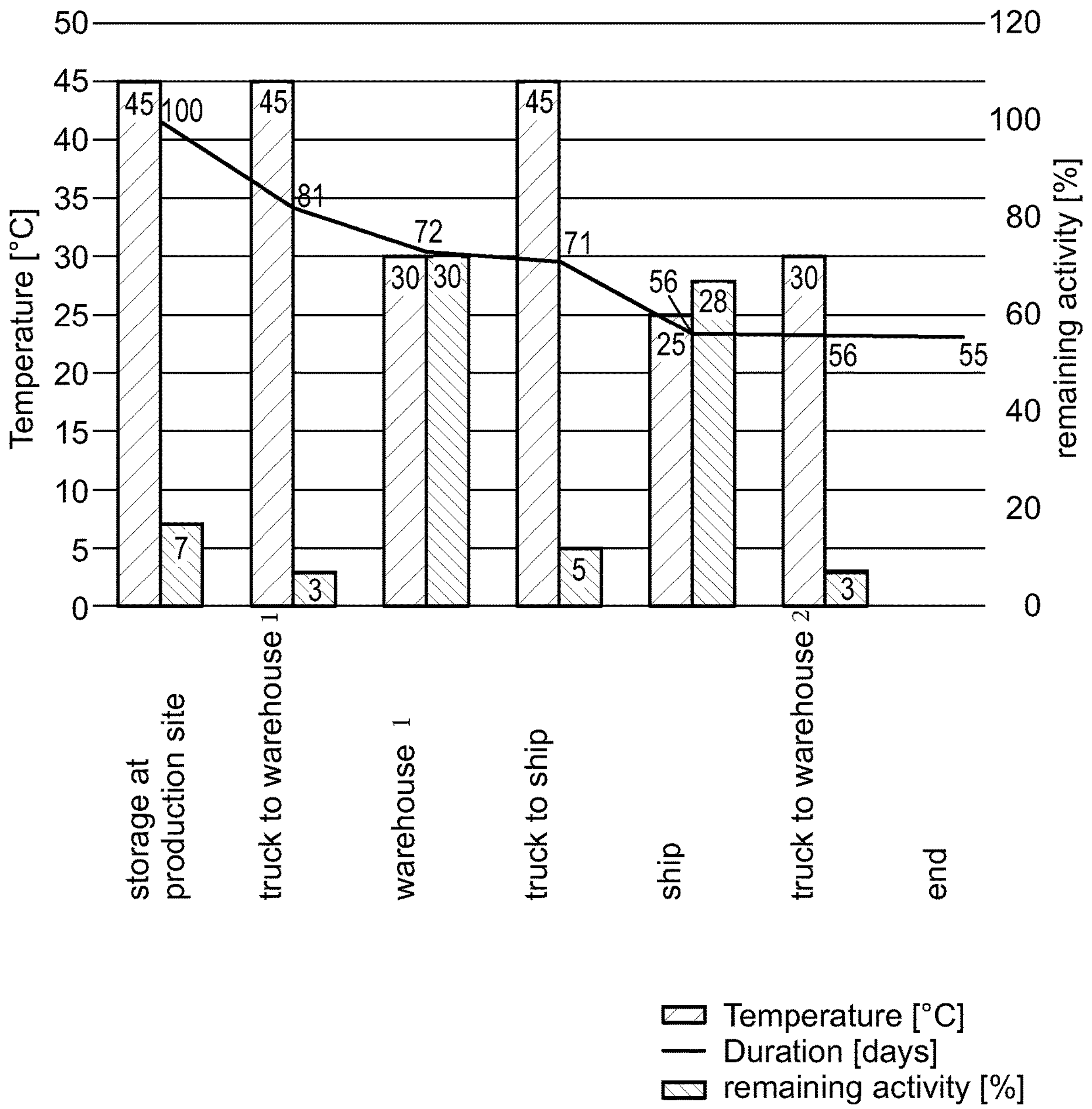

FIG. 4: Exemplary storage/transport process with remaining enzyme activity values assigned.

The following Examples shall merely illustrate the invention. They shall not be construed, whatsoever, to limit the scope of the invention.

EXAMPLE 1

As shown in FIG. 1, a system 100 for providing activity based enzyme inventory management of an enzyme formulation is disclosed. The system 100 comprises an apparatus 110 for activity based enzyme formulation management of an enzyme formulation and, further, a web server 140 configured to interface with a user via a webpage served by the web server and/or via an application program. The apparatus 110 comprises an input unit 10, a processing unit 20, and an output unit 30. In the system 100, the web server 140 may communicate with the input unit 10 and/or the output unit 30.

Apparatus 110 comprises at least one processing unit 20 such as a processor, microprocessor, or computer system, in particular for executing a logic in a given algorithm. The apparatus 110 may be configured for performing and/or executing at least one computer program of the present description. The processing unit 30 may comprise at least one processor. In particular, the processing unit 30 may be configured for processing basic instructions that drive the computer or system. As an example, the processing unit 30 may comprise at least one arithmetic logic unit (ALU), at least one floating-point unit (FPU), such as a math coprocessor or a numeric coprocessor, a plurality of registers and a memory, such as a cache memory. In particular, the processing unit 30 may be a multi-core processor. The processing unit 30 may be configured for machine learning. The processing unit 30 may comprise a Central Processing Unit (CPU) and/or one or more Graphics Processing Units (GPUs) and/or one or more Application Specific Integrated Circuits (ASICs) and/or one or more Tensor Processing Units (TPUs) and/or one or more field-programmable gate arrays (FPGAs) or the like.

The apparatus comprises at least one communication interface, preferably an output unit 30, configured for outputting data. The communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information, i.e. may be an input unit 10. The communication interface may specifically provide means for transferring or exchanging information. In particular, the communication interface may provide a data transfer connection, e.g. Blue-tooth, NFC, inductive coupling or the like. As an example, the communication interface may be or may comprise at least one port comprising one or more of a network or internet port, a USB-port and a disk drive. The communication interface may be at least one web interface. The input data comprises storage segment data as specified herein above.

The processing unit 20 may be configured for pre-processing the input data. The pre-processing unit 20 may comprise at least one filtering process for input data fulfilling at least one quality criterion. The processing unit 20 is configured for determining at least one remaining enzyme activity, preferably as specified herein above and below in the further Examples.

The web server 140 is configured to provide a GUI for the apparatus 110. Thus, the web server may exchange data with the output unit 30, e.g. for displaying said data on the GUI. The web server 140 may, however, also exchange data with the input unit of the apparatus, e.g. information on the enzyme stability model to use and/or to input an initial enzyme activity value.

EXAMPLE 2

A protease formulation for washing purposes was stored for various time periods at various temperatures. The remaining activity values were fit into a Weibull model (FIG. 2). The specific parameters of the model obtained for the specific enzyme formulation were:

$A_0$=99.5%

$k_0$=0.0376 days$^{-1}$ $E_a$=182.1 kJ/mol n=1.15

$T_{ref}$=318.15 K (45° C.)

EXAMPLE 3

A web interface for user interaction may be configured as exemplarily shown in FIG. 3. The web page allows selection between enzyme stability models, shows fit of remaining activity data into the model, and may allow to select a storage temperature and a storage duration. As will be understood, it is also possible to include a plurality of storage segments into such a web interface.

EXAMPLE 4

FIG. 4 shows an exemplary storage profile of the enzyme formulation of example 1 together with remaining enzyme activity values calculated with a Weibul model, based on the data of Example 2. High-temperature segments or segments with long duration case a stronger decrease than short and/or cool storage segments.

REFERENCE SIGNS

| | |
|---|---|
| 10 | input unit |
| 20 | processing unit |
| 30 | output unit |
| 100 | system |
| 110 | apparatus |
| 140 | web server |

REFERENCES

Brown 1987), Australian J Botany 35(5):581
EP 1921147
DelMar et al. (1979), Analytical Biochem 99, 316-320
Gupta et al. (2002), Appl. Microbiol. Biotechnol. 60: 381-395
Gupta et al. (2003), Biotechnol. Appl. Biochem. 37, p. 63-71
Martinus & Boekel (2002), Int J Food Microbiol 74(1-2):139
Sant'Anna et al. (2013); Bioprocess Biosyst Eng 36:993
E. P. Schokker, Ph.D. Thesis, University of Wageningen, 1997

The invention claimed is:

1. A computer-implemented method, performed by an apparatus comprising a sensor located in close proximity to or within an enzyme formulation, a processor, and a dosing unit, the method comprising: (i) sensing, via the sensor, storage segment data including time-varying temperature data during storage of the enzyme formulation, and obtaining an initial enzyme activity value of; the enzyme formulation (ii) determining, via the processor executing a stability model comprising an Arrhenius-type or Weibull-type temperature-dependent degradation model, a remaining activity value of the enzyme formulation based on the sensed storage segment data and the initial enzyme activity value; (iii) outputting the remaining activity value to an output unit; and (iv) automatically controlling the dosing unit or dosing equipment configured to dispense the enzyme formulation, wherein the controlling adjusts an amount of the enzyme formulation dispensed during an industrial process based on the remaining activity value.

2. The computer-implemented method of claim 1, wherein at least one storage segment data is determined based on sensor data from the sensor, the sensor providing the time-varying temperature data.

3. The computer-implemented method of claim 1, wherein the sensor is located within the same storage space as the enzyme formulation and/or is attached to a packaging, a pallet, or an outer shell of a container of the enzyme formulation and is configured to sense the time-varying storage segment data.

4. The computer-implemented method of claim 2, wherein the sensor data is corrected, specifically by one or both of an input unit and a processing unit, by calculating a temperature within the enzyme formulation based on the sensed storage segment data; and/or wherein the sensor data is received from at least one sensor located within the enzyme formulation.

5. The computer-implemented method of claim 1, wherein the enzyme formulation is exposed to a multitude of non-identical storage segments differing at least in temperature.

6. The computer-implemented method of claim 1, wherein a temperature of at least one storage segment is not controlled.

7. The computer-implemented method of claim 1, wherein in step (ii) the remaining activity value of the enzyme formulation is calculated based on a model comprising a time-varying temperature parameter reflecting multiple storage segments at different temperatures.

8. The computer-implemented method of claim 1, wherein the model comprises at least one temperature-dependent Weibull type equation, rather than an Arrhenius-type equation, or in combination with an Arrhenius-type equation.

9. An apparatus, comprising: a sensor located in close proximity to or within an enzyme formulation and configured to sense storage segment data including time-varying temperature data during storage of the enzyme formulation, and to provide the storage segment data together with an initial enzyme activity value of the enzyme formulation: a processing unit configured to execute a stability model comprising an Arrhenius-type or Weibull-type temperature-dependent degradation model to determine a remaining activity value of the enzyme formulation based on the sensed storage segment data and the initial enzyme activity value; an output unit configured to output the remaining activity value; and a dosing unit or dosing equipment configured to dispense the enzyme formulation, wherein the dosing unit or dosing equipment is automatically controlled based on the remaining activity value to adjust an amount of the enzyme formulation dispensed during an industrial process.

10. The apparatus according to claim 9, further configured to perform at least one of the following: output the value of the remaining activity value of the enzyme formulation via the output unit; output, via the output unit, the determined remaining activity value of the enzyme formulation; determine by the processing unit and output via the output unit a residual shelf life value of the enzyme formulation; determine by the processing unit and output via the output unit a dosage instruction for the enzyme formulation, including an instruction that reflects the automatic control of the dosing unit or dosing equipment; and/or automatically elicit an order of an additional batch of enzyme formulation if the remaining activity value indicates that the total enzyme activity in the enzyme formulation is below a pre-determined threshold value.

11. The apparatus according to claim 10, further configured to: download relevant information including quality information, regulatory information, safety data, and/or technical documents; order enzyme formulations; and/or provide a user-feedback including usability, information content and/or enzyme formulation outcome, wherein such information is generated in response to the automatically controlled dosing based on the remaining activity value.

12. The apparatus according to claim 9, wherein the apparatus is a washing machine and further comprises: a container unit configured to store an enzyme formulation; and a dosage unit configured to dose an amount of the enzyme formulation comprised in the container unit during a wash cycle, wherein the dosing unit is automatically controlled to adjust the dispensed amount based on the remaining activity value determined by the processing unit.

13. A computer program comprising instructions which, when the program is executed by a processor of the apparatus, cause the apparatus and/or the system to perform the method of claim 1, including automatically controlling the dosing unit or dosing equipment during an industrial process based on the remaining activity value.

14. A computer-readable storage medium comprising instructions which, when executed by an apparatus cause the apparatus and/or the system to perform the method of claim 1, including the automatic control of the dosing unit or dosing equipment.

15. The computer-implemented method according to claim 1 for determining a remaining activity value of an enzyme formulation in a washing machine, wherein the determined remaining activity value is used to automatically control a dosage unit of the washing machine.

16. The computer program of claim 13, wherein the apparatus is the apparatus of claim 9.

17. The computer-readable storage medium of claim 14, wherein the apparatus is the apparatus of claim 9.

* * * * *